(12) United States Patent
Gobert et al.

(10) Patent No.: US 7,395,668 B2
(45) Date of Patent: *Jul. 8, 2008

(54) TURBO CHARGED DIESEL-TYPE PISTON ENGINE AND METHOD FOR CONTROLLING SUCH AN ENGINE

(75) Inventors: Ulrich Gobert, Göteborg (SE); Daniel Grunditz, Öjersjö (SE); Sebastian Krausche, Höllviken (SE)

(73) Assignee: Volvo Lastvagnar AB, Gothenburg (SE)

( * ) Notice: Subject to any disclaimer, the term of this patent is extended or adjusted under 35 U.S.C. 154(b) by 45 days.

This patent is subject to a terminal disclaimer.

(21) Appl. No.: 11/164,243

(22) Filed: Feb. 23, 2006

(65) Prior Publication Data

US 2006/0123788 A1 Jun. 15, 2006

Related U.S. Application Data

(63) Continuation of application No. PCT/SE2004/000752, filed on May 14, 2004, now abandoned, and a continuation of application No. PCT/SE2004/000715, filed on May 11, 2004, now abandoned.

(30) Foreign Application Priority Data

May 15, 2003 (SE) .................................... 0301412

(51) Int. Cl.
- *F02B 33/44* (2006.01)
- *F01L 1/34* (2006.01)
- *F02D 13/06* (2006.01)
- *F02D 17/02* (2006.01)

(52) U.S. Cl. .................. 60/612; 60/601; 123/305; 123/90.15; 123/90.16; 123/90.17; 123/198 F

(58) Field of Classification Search ................ 60/612, 60/611, 601; 123/562, 305, 90.15, 90.16, 123/90.17, 295, 559.1, 198 F
See application file for complete search history.

(56) References Cited

U.S. PATENT DOCUMENTS

| 2,670,595 A | 3/1954 | Miller | 123/297 |
| 2,759,662 A | 8/1956 | Carrier | 415/199.2 |
| 3,257,797 A * | 6/1966 | Lieberherr | 60/612 |

(Continued)

FOREIGN PATENT DOCUMENTS

FR 2282058 A1 3/1976

(Continued)

OTHER PUBLICATIONS

International Search Report for International Patent Application PCT/SE2004/000715, dated Aug. 12, 2004.

*Primary Examiner*—Thai-Ba Trieu
(74) *Attorney, Agent, or Firm*—Novak Druce + Quigg LLP

(57) ABSTRACT

A piston engine and a method for controlling a diesel-type piston engine including at least one combustion chamber formed by a cylinder, a movably arranged piston in each cylinder, which piston is connected to a crankshaft, an injection device designed to inject fuel directly into the combustion chamber and turbo system comprising a low pressure turbo and a high pressure turbo. The thermal efficiency of the internal combustion is increased while requirements relating to nitrogen oxide and soot particle emissions continue to be maintained.

43 Claims, 11 Drawing Sheets

U.S. PATENT DOCUMENTS

| | | | |
|---|---|---|---|
| 4,009,695 A * | 3/1977 | Ule | 123/90.13 |
| 4,667,510 A * | 5/1987 | Schroeder | 73/117.3 |
| 4,902,487 A | 2/1990 | Cooper et al. | 423/215.5 |
| 5,103,779 A | 4/1992 | Hare, Sr. | 123/90.16 |
| 5,392,745 A | 2/1995 | Beck | 123/295 |
| 5,433,180 A * | 7/1995 | Hitomi et al. | 123/559.1 |
| 5,537,961 A | 7/1996 | Shigeru et al. | 123/90.15 |
| 5,553,575 A * | 9/1996 | Beck et al. | 123/198 F |
| 5,682,854 A | 11/1997 | Ozawa | 123/316 |
| 6,053,134 A | 4/2000 | Linebarger | 123/90.16 |
| 6,063,350 A | 5/2000 | Tarabulski et al. | 423/239.1 |
| 6,257,190 B1 | 7/2001 | Linebarger | |
| 6,273,076 B1 | 8/2001 | Beck et al. | 60/612 |
| 6,279,550 B1 * | 8/2001 | Bryant | 123/562 |
| 6,349,706 B1 | 2/2002 | Hsu et al. | 123/500 |
| 6,467,257 B1 | 10/2002 | Khair et al. | 60/278 |
| 6,484,500 B1 * | 11/2002 | Coleman et al. | 60/612 |
| 6,651,618 B1 * | 11/2003 | Coleman et al. | 123/316 |
| 6,688,280 B2 * | 2/2004 | Weber et al. | 123/562 |
| 6,951,211 B2 * | 10/2005 | Bryant | 123/316 |
| 7,059,295 B2 * | 6/2006 | Blessing et al. | 123/299 |
| 7,140,346 B2 * | 11/2006 | Gobert et al. | 123/305 |
| 2004/0112329 A1 * | 6/2004 | Coleman et al. | 123/305 |
| 2006/0042586 A1 * | 3/2006 | Hutmacher et al. | 123/276 |
| 2006/0123781 A1 * | 6/2006 | Gobert et al. | 123/305 |

FOREIGN PATENT DOCUMENTS

GB        1438172 A        6/1976

* cited by examiner

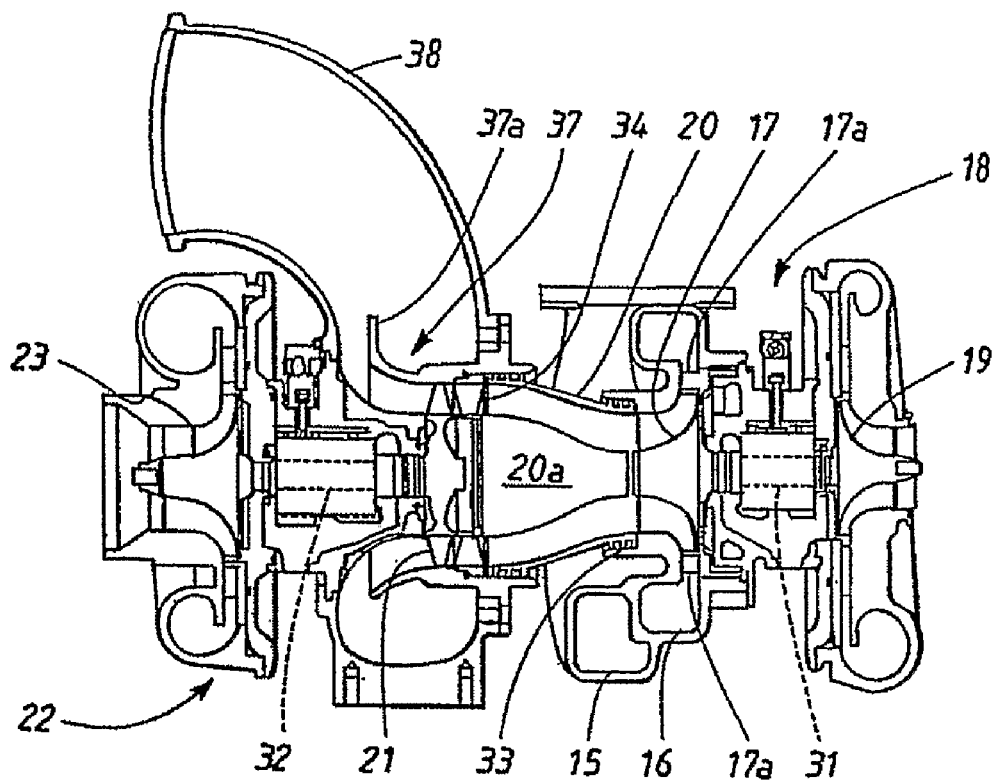
FIG.13
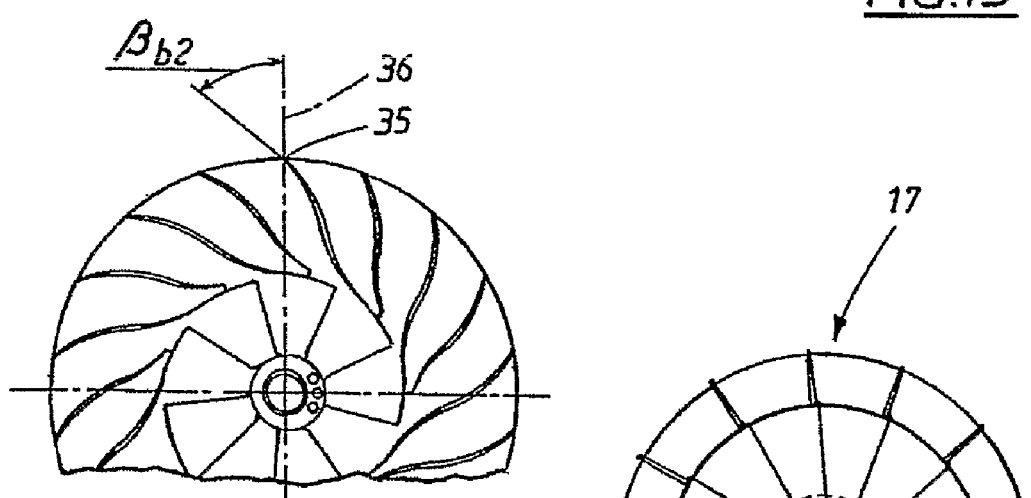
FIG.14
FIG.15

TURBO CHARGED DIESEL-TYPE PISTON ENGINE AND METHOD FOR CONTROLLING SUCH AN ENGINE

CROSS-REFERENCE TO RELATED APPLICATIONS

The present application is a continuation patent application of International Application No. PCT/SE2004/000752 filed 14 May 2004 and International Application No. PCT/SE2004/000715 filed 11 May 2004, both of which were published in English pursuant to Article 21(2) of the Patent Cooperation Treaty, and both of which claim priority to Swedish Application No. 0301412-3 filed 15 May 2003. Said applications are expressly incorporated herein by reference in their entireties.

TECHNICAL FIELD

The present invention relates to a method for controlling a piston engine. Particularly, it relates to a method for controlling a diesel-type internal combustion engine in which fuel is injected directly into the combustion chambers for ignition.

BACKGROUND OF THE INVENTION

In a standard direct-injection diesel engine for heavy goods vehicles, i.e. a diesel engine with a cubic capacity between 0.5 and 4 liters per cylinder, the engine is controlled for a combustion at a maximum cylinder pressure amounting to about 180 bar at 22 bar BMEP. In such an engine, fuel is injected directly into the combustion chambers at about 30 crank angle degrees when the internal combustion engine is under maximum load. At maximum load, the injection is usually initiated 10-15 degrees before upper dead center and continues up to about 15-20 degrees after dead center depending on the operating point of the engine. A conventional internal combustion engine of this type is fitted with a turbo system having a turbo map efficiency amounting to about 55-60%. The maximum charge pressure from the turbo system amounts to about 330 kPa absolute pressure. Conventional diesel engines of the above-stated type have a thermal efficiency amounting to about 45-46% at maximum. By thermal efficiency is meant that share of the energy content of the fuel which is released during combustion which the engine is capable of converting into useful mechanical work.

For the turbo map efficiency $\eta_{turbo}$, the following relation is valid: $\eta_{turbo} = \eta_{compressor} \cdot \eta_{turbine} \cdot \eta_{mechanical}$, where $\eta_{compressor}$ is the efficiency of the compressor stage, $\eta_{turbine}$ is the efficiency of the turbine and $\eta_{mechanical}$ is the efficiency of the power transmission between turbine and compressor. The respective efficiencies for compressor and turbine stage are drawn from charts produced by testing, alternatively calculation, with a non-pulsating flow over the component. By turbo map efficiency is meant the efficiency obtained by multiplying together efficiency values for the turbine stage and the compressor stage, drawn from such charts, for the operating points under which the device is driven, and multiplying the result by the relevant mechanical efficiency.

In recent years, statutory requirements pertaining to emissions from diesel engines, especially relating to discharges of nitrogen oxide compounds and particles, have been tightened. The substance quantity of nitrogen oxides which is formed when fuel is combusted in a cylinder is dependent on the temperature at, and duration of the combustion. Higher temperature leads to a greater share of the nitrogen in the air being converted into nitrogen oxides. One way of reducing the quantity of formed nitrogen oxide is to reduce the temperature at combustion. Reducing the temperature at combustion, however, creates problems. In certain operating conditions, the quantity of soot particles increases, which can result in an engine, for this reason, failing to win approval under prevailing emissions legislation. Moreover, the thermal efficiency of the internal combustion engine may diminish when the temperature falls. Nitrogen oxides formed during the combustion can be reduced, however, and hence re-converted into nitrogen by the after-treatment of exhaust gases in catalytic reaction chambers located in the exhaust pipe. The presence of catalytic reaction chambers raises, however, the exhaust-gas back-pressure. An increased exhaust-gas back-pressure causes a fall in the thermal efficiency of the internal combustion engine. Furthermore, the demands for reduced discharges of soot particles can necessitate the use of so-called particle traps, should the internal combustion engine, in certain operating points, generate excessive particle quantities, in order to satisfy prevailing emission requirements. Particle traps also give rise to increased exhaust back-pressure and hence lower thermal efficiency for the internal combustion engine.

One problem facing manufacturers of internal combustion engines on which statutory requirements are imposed with respect of maximally permitted emission levels of soot particles and nitrogen oxide compounds lies in the fact that the required permitted emission levels are constantly being lowered. Demands for reduced emission levels mean, firstly, that the engine cannot be optimized for low fuel consumption and, secondly, that emission-reducing peripheral equipment is called for which contributes to reduced thermal efficiency for the internal combustion engine.

SUMMARY OF THE INVENTION

An object of the invention is to provide a method for controlling an internal combustion engine, by which the thermal efficiency of the internal combustion engine can be increased while the requirements relating to nitrogen oxide and soot particle emissions continue to be maintained.

This object is achieved by virtue of the fact that the low-pressure turbo and high-pressure turbo fitted to the internal combustion engine each have a turbo map efficiency greater than 60%, and the control mechanism of gas exchange valves is configured to provide at least a first operating range for the internal combustion engine at a mean piston velocity greater than 6 m/s and at an engine load greater than 15 bar BMEP, in which the volumetric efficiency within said first range is less than 70%.

The effect of such a control mechanism is explained in greater detail below.

According to one embodiment of the invention, gas exchange valves fitted to the combustion chamber are controlled so as, within an operating range for the internal combustion engine with a load between 5 and 30 bar BMEP and for mean piston velocities between 5 and 7.5 m/s, to provide a minimum gas-volumetric efficiency less than 85%. By gas exchange valves, it is meant inlet valves and exhaust valves. The control is effected by—changing the opening and closing times of the gas exchange valves in relation to the respective opening and closing time normally arranged for the internal combustion engine, which opening and closing time is arranged to give the internal combustion engine the highest possible gas-volumetric efficiency. An engine in which the inlet valves are controlled in order to provide lower gas-volumetric efficiency is usually referred to as a Miller engine. The concept of the Miller engine was described in U.S. Pat. No. 2670595. According to a further embodiment of the invention, the volumetric efficiency varies in dependence on the load on the internal combustion engine and the mean piston velocity of the internal combustion engine. The volumetric efficiency is allowed to vary between 45 and 85% according to that which is evident from FIG. 1. According to one variant of this embodiment, the inlet valves are closed early in order to provide low gas-volumetric efficiency. In a modern standard engine, the closure of an inlet valve takes place at zero valve clearance up to 56 crank angle degrees after lower dead center. The effect of this is that the gas-volumetric efficiency normally amounts to at least 90%. According to the invention, where a fixed cam profile is used, closing times of the inlet valve (at zero valve clearance) down to 30 crank angle degrees before lower dead center at high load and high r. p. m. are utilized. It is also possible to make use of electromechanically controlled inlet valves and/or electromechanically controlled exhaust valves. The opening and closing process, respectively, usually proceeds more rapidly with electromechanical valve control than if a conventional camshaft is utilized. This means that opening times and closing times have to be shifted relative to the use of a conventional camshaft-actuated valve. Opening times and closing times for electromechanically controlled valves are set in this case so as to obtain the desired charge density or gas-volumetric efficiency in the cylinder chambers.

By gas-volumetric efficiency it is meant the ratio between supplied gas quantity and the cubic capacity of the combustion chamber. Should exhaust gas recirculation (EGR) be utilized, the supplied gas quantity comprises the sum of supplied gas quantity and supplied air quantity. Should EGR not be utilized, supplied gas quantity merely comprises supplied air.

In an internal combustion engine equipped with one or more turbo units, the internal combustion engine can be controlled so as to prioritize the effectiveness of the combustion process in the cylinders or to prioritize the gas turbine process for the turbo system through optimization of the gas-volumetric efficiency of the engine or optimization between the combustion process and gas turbine process respectively. The effectiveness of the combustion process in the cylinders is improved by optimizing the gas quantity (which affects the parasitic losses in the form of friction, heat transfer and gas exchange work) which is supplied to the combustion process. The gas quantity is controlled through gas-volumetric efficiency (in the illustrative embodiment, by varying the closing point for the inlet valve). The gas turbine process is also promoted by control of the gas flow through the engine. The optimal choice of gas-volumetric efficiency for a certain operating point is such that the gas turbine process and the combustion process simultaneously operate with high process efficiency. The optimal choice of gas-volumetric efficiency is heavily dependent on the process efficiency of the gas turbine process. The higher the process efficiency for the gas turbine process, the lower is the optimal gas-volumetric efficiency for a given operating point. With a very effective gas turbine process (a turbo map efficiency of at least 70% in a serial two-stage system with intermediate cooling and after-cooling), optimal gas-volumetric efficiency is shown to be lower than 70% for the operating points important to a heavy diesel engine.

That the gas flow through the engine is important to thermal efficiency is shown clearly in FIGS. 2 and 3. By varying the gas-volumetric efficiency between operating points, the air excess is able to be controlled. For an internal combustion engine having an assigned turbo arrangement, it is the case that for a given efficiency for the turbo system there is, for a given desired air-fuel ratio, a volumetric efficiency which optimizes the engine in terms of thermal efficiency. In FIG. 2, the thermal efficiency is shown as a function of the air excess factor $\lambda$ for a turbo system comprising a first, low-pressure turbo and a second, high-pressure turbo disposed downstream of said low-pressure turbo, in which the high-pressure turbo and low-pressure turbo forming the turbo system have an efficiency amounting to 50%. It can be seen from the figure that the volumetric efficiency is not significant to the thermal efficiency for an air excess factor less than 1.8. For air excess factors greater than 1.8, it is the case that a lower volumetric efficiency produces a lower thermal efficiency for a given value of the air excess factor.

In FIG. 3, the thermal efficiency is shown as a function of the air excess factor for a turbo system comprising a first, low-pressure compressor and a second, high-pressure turbo disposed downstream of said low-pressure turbo, in which the turbo stages making up the turbo system have an efficiency amounting to 70%. It is evident from this figure that a lower volumetric efficiency produces a higher thermal efficiency for a given value of the air excess factor. That is to say, when the turbo map efficiency per turbo stage is sufficiently high, i.e. according to a first embodiment the turbo map efficiency is greater than 60%, according to a second, preferred embodiment the turbo map efficiency is greater than 65% and according to a third, additionally preferred embodiment the turbo map efficiency is greater than 70%, then the thermal efficiency increases with reduced volumetric efficiency. It can further be seen that the thermal efficiency is relatively constant for normal air excess factors within the range 1.7-2.1 at low volumetric efficiency. On the other hand, thermal efficiency declines strongly with increased volumetric efficiency. Preferably, it is ensured that the volumetric efficiency is less than 70%, preferably less than 60%, at a mean piston velocity of 6.25 m/s and at an engine load amounting to 26 bar BMEP.

FIGS. 4-6 show the thermal efficiency expressed as BSFC (Break Specific Fuel Consumption) as a function of the closing time of the induction valve. The studies relate to an internal combustion engine provided with a two-stage supercharging system. The induction valve is controlled by a camshaft with fixed cam profile. Should an electromechanically controlled induction valve be utilized, the valve times, owing to the fact that such valves have faster opening and closing processes, will need to be shifted in order to obtain the desired gas-volumetric efficiency in the gas flow through the cylinders.

In FIGS. 4-6 it can be seen that BSFC increases strongly for closing times of the induction valve less than 500 crank angle degrees. This is dependent on the gas-volumetric efficiency diminishing increasingly rapidly in this region.

FIG. 4 represents the thermal efficiency expressed as BSFC (Break Specific Fuel Consumption) as a function of the closing time of the induction valve for an engine equipped with a conventional two-stage supercharging system with conventional efficiency amounting to about 56% for a compressor/turbine pair. The engine is designed for rapid combustion according to the invention. In this case, it can be seen that the thermal efficiency is not significantly affected by the use of low volumetric efficiency.

FIG. 5 represents the thermal efficiency expressed as a function of the closing time of the induction valve for an engine equipped with an improved two-stage supercharging system with enhanced efficiency amounting to about 65% for a compressor/turbine pair. The engine is designed for rapid combustion according to the invention. In this case, it can be seen that the thermal efficiency rises to reach an optimum at a closing time of the inlet valve around 515 crank angle degrees, i.e. 25 crank angle degrees before lower dead center, for a lambda value of 1.9 (continuous line); an optimum at a closing time of the inlet valve around 525 crank angle degrees, i.e. 15 crank angle degrees before lower dead center, for a lambda value of 2.1 (dashed line); and an optimum at a closing time of the inlet valve around 535 crank angle degrees, i.e. 5 crank angle degrees before lower dead center, for a lambda value of 2.3 (dotted line). The optimum becomes less clear when the value of the air excess factor lambda rises.

FIG. 6 represents the thermal efficiency expressed as BSFC (Break Specific Fuel Consumption) as a function of the closing time of the induction valve for an engine equipped with a conventional two-stage supercharging system with enhanced efficiency amounting to about 70% for a compressor/turbine pair. The engine is designed for rapid combustion according to the invention. In this case, it can be seen that the thermal efficiency rises, i.e. that BSFC falls, to reach an optimum at a closing time of the inlet valve around 505 crank angle degrees, i.e. 35 crank angle degrees before lower dead center, for a lambda value of 1.9 (continuous line); an optimum at a closing time of the inlet valve around 515 crank angle degrees, i.e. 25 crank angle degrees before lower dead center, for a lambda value of 2.1 (dashed line); and an optimum at a closing time of the inlet valve around 525 crank angle degrees, i.e. 15 crank angle degrees before lower dead center, for a lambda value of 2.3 (dotted line). In this case, the benefit of an early closure of the inlet valve appears even clearer than where a turbo arrangement with 65% efficiency per stage is utilized. Furthermore, the curve for the air excess factor lambda=2.3 continues to exhibit a clear optimum for early closure of the inlet valve.

In previously known engine designs, the Miller concept has been dismissed, since it could not contribute significantly to increased thermal efficiency for the engine. This preferred embodiment of the invention makes use of the surprising fact that, in the use of internal combustion engines with rapid combustion, i.e. a specific injection time less than 0.12 crank angle degrees/(bar×m/s), together with a two-stage turbo arrangement in which each stage comprises a turbine/compressor pair with a mechanical efficiency greater than 60%, preferably greater than 65%, and especially preferably amounting to at least 70%, increased thermal efficiency is achieved by ensuring that the internal combustion engine can operate within an operating range with relatively low volumetric efficiency and in which, at the same time, the thermal efficiency is high.

According to one embodiment of the invention, gas exchange valves fitted to said combustion chamber are controlled to provide a volumetric efficiency which varies between 45% and 85% in dependence on the operating state of the engine. According to one embodiment of the invention, gas exchange valves are utilized, the opening and/or closing process of which is adjustable.

According to this embodiment of the invention, the internal combustion engine is guaranteed the correct air quantity by virtue of the closing time for the inlet valves of the combustion chamber being varied in dependence on the operating state of the internal combustion engine. According to one variant of this embodiment, the gas exchange valves are controlled so as to provide at least a first operating range for the internal combustion engine at a mean piston velocity greater than 6 m/s and at an engine load greater than 15 bar BMEP, in which the volumetric efficiency within said first range is less than 70%. The variation of the gas-volumetric efficiency can be achieved by providing electronically controlled valves, mechanically controlled valves with variable cam profile or by, in some other way known to the person skilled in the art, varying closing times for valves of an internal combustion engine.

In the example below, suitable closing times for the inlet valve are shown where a camshaft with fixed cam profile is utilized. The example shows how the gas-volumetric efficiency should be chosen in order to obtain a good thermal efficiency.

According to a first illustrative embodiment, the closure of the inlet valve is brought forward to within the range 30 crank angle degrees before lower dead center to 20 crank angle degrees after lower dead center for a turbo arrangement with 65% efficiency per stage.

In summary, it turns out that the inlet valve should preferably be closed around 10 crank angle degrees before lower dead center, i.e. about 20-0 crank angle degrees before lower dead center, for a lambda between 2.1 and 2.3, and around 20 crank angle degrees before lower dead center, i.e. about 30-10 crank angle degrees before lower dead center, for a lambda amounting to 1.9 for a turbo arrangement with 65% efficiency per stage.

Where a turbo arrangement with 70% efficiency per turbo unit, it is the case that the inlet valve should preferably be closed around 20 crank angle degrees before lower dead center, i.e. about 30-10 crank angle degrees before lower dead center, for a lambda between 2.1 and 2.3, and around 30 crank angle degrees before lower dead center, i.e. about 40-20 crank angle degrees before lower dead center.

The above illustrative embodiments of the invention, in which early closure of the inlet valve results in the volumetric efficiency falling below 85%. In certain operating scenarios, the volumetric efficiency will be as low as 48% at optimum for the thermal efficiency of the internal combustion engine.

It has also been shown that the NOx formation declines if the closure of the inlet valve is brought forward according to the above-stated. In FIGS. 4-6, NOx formation is shown as a function of the closing time for the inlet valve. This also contributes to enhanced thermal efficiency, since less exhaust after-treatment, which, in itself, puts load upon the internal combustion engine, is required.

According to one embodiment, the air and fuel supply to the combustion chamber is adjusted to provide an air excess factor ($\lambda$) greater than 1.9. By utilizing a larger air excess than normal, the thermal efficiency of the internal combustion engine increases, at the same time as sooting diminishes with maintained NOx formation.

According to preferred variants of the invention, the reduced volumetric efficiency is achieved by the inlet valves being closed before lower dead center. In these cases, the volumetric efficiency is reduced upon expansion of the air present in the combustion chamber as the piston moves from the position of the piston at the time of the closure of the inlet valve and lower dead center. This expansion leads to the air in the combustion chamber being cooled somewhat. The cooled air helps, in turn, to reduce the quantity of NOx formed in the combustion. Moreover, the thermal load upon the cooling system of the internal combustion engine diminishes, which contributes to smaller cooling losses and hence increased thermal efficiency for the engine.

According to one embodiment of the invention, a fixed cam, producing a low gas-volumetric efficiency, is utilized. By fixed cam is meant a mechanically controlled opening and closing device, in which opening time and closing time cannot be varied. According to one variant of the embodiment, the desired volumetric efficiency is achieved by closing the inlet valve before lower dead center. Such an engine is suited to fixed installations in which the engine must be driven with good efficiency at an operating point.

According to one embodiment of the invention, gas exchange valves are utilized, the opening and/or closing process of which is adjustable. In this case, gas exchange valves fitted to the combustion chamber are controlled to provide a volumetric efficiency which varies between 45% and 85% in dependence on the operating state of the engine.

According to this embodiment of the invention, the internal combustion engine is guaranteed the correct air quantity by virtue of the closing time for the inlet valves of the combustion chamber being varied in dependence on the operating state of the internal combustion engine. According to one variant of this embodiment, the gas exchange valves are controlled so as to provide at least a first operating range for the internal combustion engine at a mean piston velocity greater than 6 m/s and at an engine load greater than 15 bar BMEP, in which the volumetric efficiency within the first range is less than 70%. The variation of the gas-volumetric efficiency can be achieved by providing electronically controlled valves, mechanically controlled valves with variable cam profile or by, in some other way known to the person skilled in the art, varying closing times for valves of an internal combustion engine.

The variation is preferably carried out such that the closing time of the inlet valve is brought forward with increased engine load and speed. One example of how the variation of the closing time can be carried out is shown in FIG. 7. In this illustrative embodiment, the earliest possible closure at all operating points is employed at an engine speed of 1500 r.p.m. The closing point is set at 520 crank angle degrees.

Conventionally, the closing point is set at 596 crank angle degrees. At an engine speed of 1250 r.p.m., the closing point of 520 crank angle degrees is utilized at full load and partial load corresponding to 75% of full load. For partial load corresponding to 50% of full load, the closing point of 550 crank angle degrees is utilized, and for partial load corresponding to 25% of full load, the closing point of 596 crank angle degrees is utilized. At an engine speed of 1000 r.p.m., the closing point of 540 crank angle degrees is utilized at full load. For partial load corresponding to 75% of full load, the closing point of 550 crank angle degrees is utilized. For the partial loads corresponding to 50% and 25% of full load, the closing point of 596 crank angle degrees is utilized. According to this embodiment, the variation of the closing point is utilized to ensure that the combustion chamber of the internal combustion engine is given the correct air quantity under varying operating conditions. The supercharging system can thereby be more freely controlled in order to ensure that the supercharging system works under operating conditions which allow good efficiency for the supercharging system. The fact that the inlet valve remains open for a longer time under low load and at low engine speed means that the internal combustion engine acquires a very good transient response within this working range. In the present application, the closing point is dimensioned so that the upper dead center, in connection with the opening of the inlet valve in the induction phase in a four-stroke internal combustion engine, lies at 360°. The following lower dead center lies at 540°.

In conventional diesel-type internal combustion engines, the injection has to be initiated early, 10-15 crank degrees before upper dead center, in order to ensure that a sufficient quantity of fuel is supplied before upper dead center, thereby alleviating the adverse effects arising from injection to an expanding and hence cooled combustion chamber. Examples of such adverse effects are diminished thermal efficiency and increased sooting. In conventional diesel-type internal combustion engines, furthermore, the injection continues up to 15-20 crank angle degrees after upper dead center. The slow combustion leads to a lot of heat being evacuated to the cooling system of the internal combustion engine, resulting in a reduction in the thermal efficiency of the internal combustion engine. In slow combustion, moreover, hot exhaust gases are evacuated in greater measure, thereby also contributing to reduced thermal efficiency. A substantial shortening of the injection time in relation to known direct-injection diesel engines ensures that the problems associated with a long injection time are reduced and that the thermal efficiency for the engine thereby increases. According to one embodiment of the invention, fuel is injected from the injection device with a specific injection time less than 0.12 crank angle degrees/(bar×m/s) when the load upon the internal combustion engine is greater than 7 bar BMEP.

Specific injection time is a measure, independent of engine size, of the length of the injection time. The specific injection time ($\varphi_{spec}$) is calculated with the aid of the injection time ($\varphi_{inj}$) in crank angle degrees, the mean effective pressure (BMEP) in bar and the mean piston velocity ($v_p$) in m/s, as follows:

$$\varphi_{spec} = \frac{\varphi_{inj}}{BMEP \cdot v_p} \left[ °vv/(bar \cdot m/s) \right]$$

BMEP is defined as follows:

$$BMEP = \frac{T_{brake} \cdot 4\pi}{V} \cdot 10^{-5} [bar]$$

where $T_{brake}$ constitutes measured braked torque at the crankshaft in Nm and V constitutes the cubic capacity in m³. BMEP is thus a mean value, independent of engine size, of delivered crankshaft torque during a complete cycle inclusive of induction phase, compression phase, expansion phase and outlet phase.

The length of the injection time is defined as the distance in crank angle degrees between 50% needle lift in respect of an opening and closing flank. In FIG. 8, a graph is shown in diagrammatic representation, which graph shows the needle lift as a function of the crank angle. Both the flank describing opening of the injection valve O and the flank describing closure of the injection valve C are relatively steep. Usually there is a small overshoot Os in the opening phase dependent on elastic properties of the injection valve. Prior to the commencement of the opening, certain minor deviations B from the zero position can occur. Moreover, recoil phenomena R can result in the closing instant for the injection valve being undefined. In order to eliminate difficulties in determining the injection time, it is defined according to the above-stated as the distance D crank angle degrees between 50% needle lift in respect of the opening flank 0 and closing flank C.

The invention utilizes a short specific injection time under relative high loads and r. p. m. The threshold value for the specific injection time 0.12 crank angle degrees/(bar×m/s) is chosen so that the injection time measured in crank angle degrees shall be less than 18 crank angle degrees at 22 bar BMEP and a mean piston velocity of 7.5 m/s. 22 bar BMEP corresponds approximately to full load for a modern diesel engine for heavy-duty vehicles.

In FIGS. 9a-9d are shown measurements of the injection time for a number of operating scenarios.

In the course of development of the invention, studies have shown that an especially favorable effect upon the thermal efficiency of the internal combustion engine is obtained at higher BMEP. In preferred embodiments of the invention, the stated criterion is modified somewhat to the effect that the specific injection time shall be less than 0.095 crank angle degrees/(bar×m/s) and 0.09 crank angle degrees/(bar×m/s) at an engine load greater than 12 bar BMEP and especially at a load greater than 18 bar BMEP. The specific injection time as a function of the load on the internal combustion engine for a set of mean piston velocities is shown in FIG. 10.

According to one embodiment of the invention, the fuel supply is initiated within the range 10 crank angle degrees before upper dead center and 1 crank angle degree after upper dead center. Calculations recorded in FIG. 11 show that the thermal efficiency is heavily dependent on the starting point for the injection. Injection preferably takes place between 8 crank angle degrees before upper dead center and upper dead center. By providing a starting point of the injection time according to the above-proposed, a reduction in parasitic losses due to heat transfer and friction is ensured. The duration of the injection also has a marked effect upon the fuel consumption.

The internal combustion engine is supercharged via a turbo system comprising a low-pressure turbo and a high-pressure turbo with intermediate cooling. According to a first variant of the sixth embodiment, the high-pressure turbo and the low-pressure turbo in this turbo system have an efficiency greater than 60%. In a second variant, the efficiency is greater than 65%. In a third variant, the efficiency is greater than 70%. A turbo system having a turbo map efficiency of about 70% is described in connection with FIGS. 12-15. This turbo system comprises a low-pressure turbo and a high-pressure turbo with intermediate cooling. Calculations have shown that the rapid combustion, together with the variable closing time of the inlet valve, results in the thermal efficiency for the internal combustion engine rising by 0.15 percentage points for a one percentage point increase in turbo map efficiency. Where a conventionally controlled engine is utilized, the thermal efficiency rises by just 0.05 percentage points for a one percentage point increase in turbo map efficiency. This low contribution to improvement of the thermal efficiency has historically meant that the efficiency for the compressor part in single-stage turbines has only been improved by just a few percentage points over the last 25 years. In known commercially available turbo compressors for trucks, the efficiency has been improved from about 77% efficiency in 1977 to about 79% efficiency in the year 2000. Quite simply, further efficiency improvements have not been worth making. In the new turbo system described in connection with FIGS. 12-15, the low-pressure compressor and the high-pressure compressor have an efficiency of about 83%.

In order further to raise the thermal efficiency, the exhaust duct, turbine casing and exhaust manifold, i.e. all parts which are manifestly heated by the exhaust gases, are provided with heat-insulating coating. This leads to diminution of the heat transfer to the exhaust duct, allowing a greater share of the energy to be recovered in the supercharging system.

With a view to further raising the thermal efficiency, the air and fuel supply to the combustion chamber can be adjusted to allow a maximum cylinder pressure during combustion greater than 8*BMEP bar. In a preferred embodiment, the air and fuel supply to said combustion chamber is adjusted to allow a maximum cylinder pressure during combustion greater than 9*BMEP bar and in a further variant the air and fuel supply to said combustion chamber is adjusted to allow a maximum cylinder pressure during combustion greater than 10*BMEP bar.

The invention can be varied through combinations of the various embodiments and variants.

BRIEF DESCRIPTION OF THE DRAWINGS

An embodiment of the invention will be described below in connection with the accompanying drawings, in which:

FIG. 13 is a longitudinal section through the two turbocharger stages forming the turbocharger system;

FIG. 14 shows in partially broken plan view a compressor wheel used in the turbocharger system;

FIG. 15 shows in plan view the turbine wheel of the high-pressure turbine;

DETAILED DESCRIPTION

Figure 16:
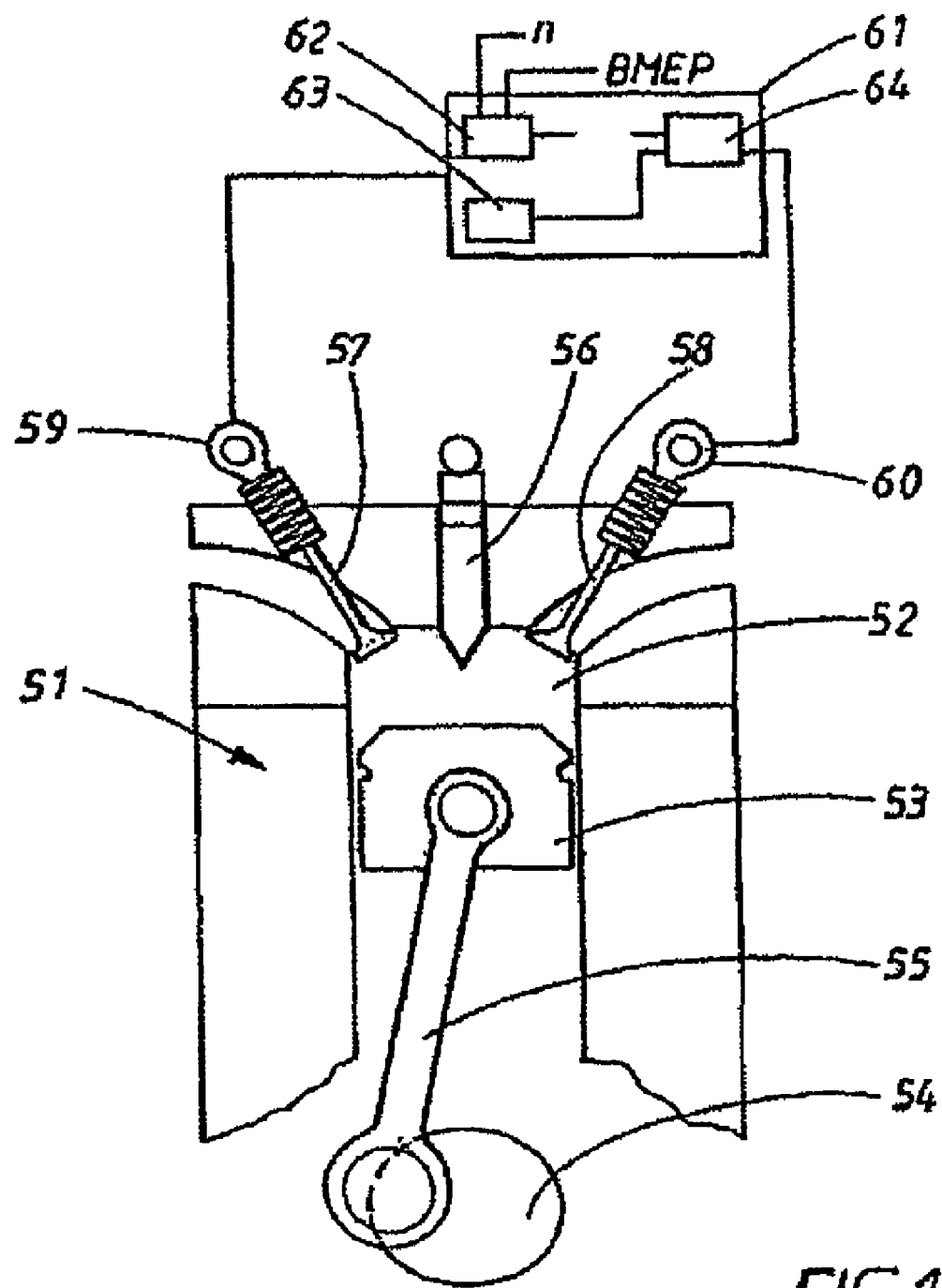
FIG. 16 shows in diagrammatic representation an internal combustion engine controlled to obtain good thermal efficiency.

FIG. 16 represents diagrammatically an internal combustion engine controlled to obtain good thermal efficiency. The internal combustion engine 51 is of the piston engine type and comprises a set of combustion chambers, each formed by a cylinder 52, a movably arranged piston 53 in each cylinder, which piston is connected to a crankshaft 54 by a connecting rod 55. The combustion chamber is fitted with an injection device 56 designed to inject fuel directly into the combustion chamber. The injection device is designed to provide a specific injection time less than 0.12 crank angle degrees/(bar× m/s) within an operating range for the internal combustion engine at a mean piston velocity greater than 6 m/s at an engine load greater than 6 bar BMEP.

To this end, the injection device comprises an injection nozzle allowing a specific injection time less than 0.12 crank angle degrees /(bar x m/s). For an internal combustion engine with a cubic capacity of 2 1/cylinder, a sprayer with increased hole area relative to conventional sprayers is preferably utilized. It is desirable, moreover, to adjust the injection equipment such that the injection speed measured in meters/second remains approximately the same as for conventional injectors. The flow coefficient for the sprayer is greater than 2.5 1/minute for an engine with a cubic capacity amounting to 2 1/cylinder. For the configuration of injection devices allowing a rapid injection time, reference is made to U.S. Pat. No. 5,392,745 and U.S. Pat. No. 6,349,706, whose descriptions are incorporated within the present document. The configuration of injector cam and spray nozzle for the achievement of a desired specific injection time is familiar to a person skilled in the art.

Each cylinder chamber 52 is fitted with at least one induction valve 57 and exhaust valve 58. The valves are preferably arranged such that they allow the internal combustion engine to operate under low volumetric efficiency according to the above-stated. To this end, the induction valve and/or the exhaust valve can be equipped with fixed cams which allow an optimally low volumetric efficiency in a fixed operating state. This is possible where the engine is used in an installation with constant load. Where the engine is to be used in an installation with variable load, valve actuators 59, 60 are preferably utilized, which are allowed adjustable opening and closing of the induction valve and/or exhaust valve. The adjustable opening and closing of gas exchange valves is previously known per se. Examples of devices for achieving variable opening and/or closing of valves are given in U.S. Pat. Nos. 6,257,190, 6,053,134, 5,537,961, 5,103,779, whose descriptions are incorporated within the present document.

Figure 1:
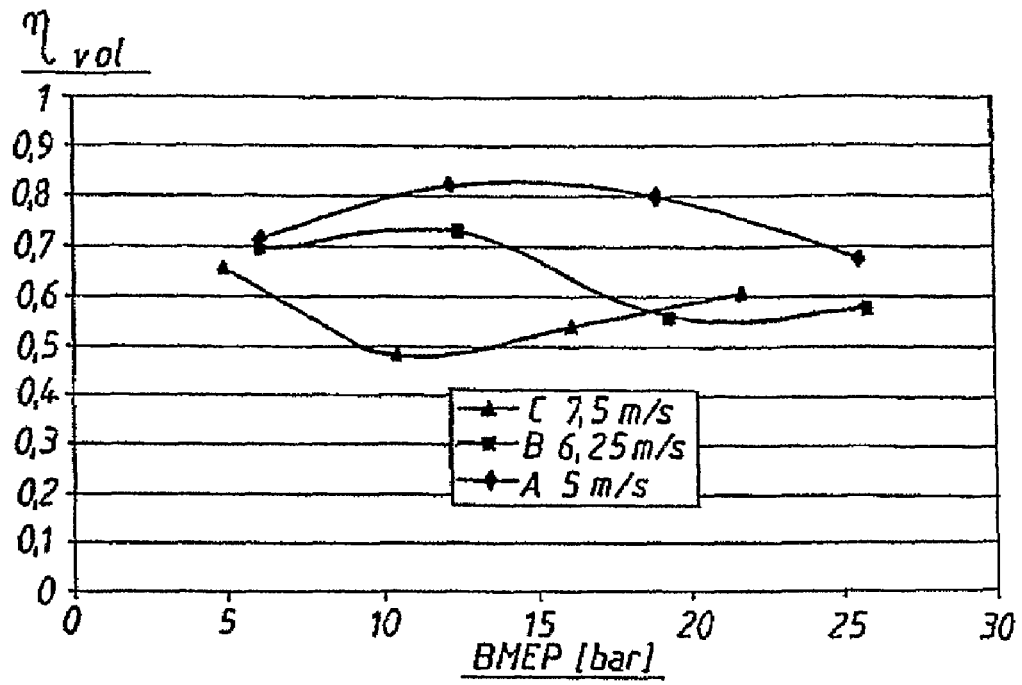
FIG. 1 shows optimal volumetric efficiency as a function of engine load.
Figure 2:
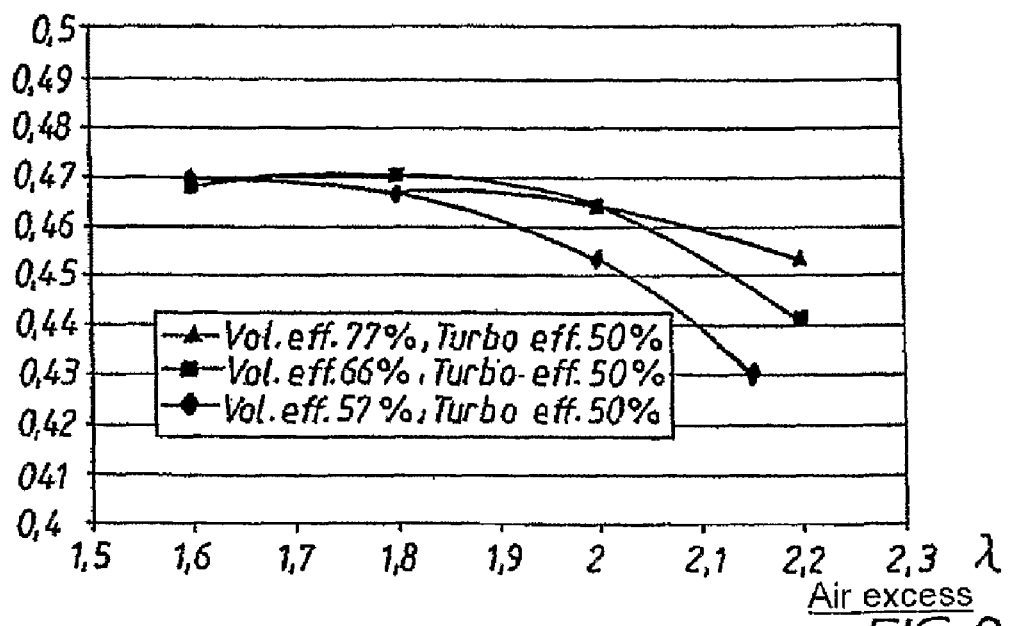
FIG. 2 shows the thermal efficiency as a function of the air excess factor for a turbo system having a turbo map efficiency amounting to 50% per stage.
Figure 3:
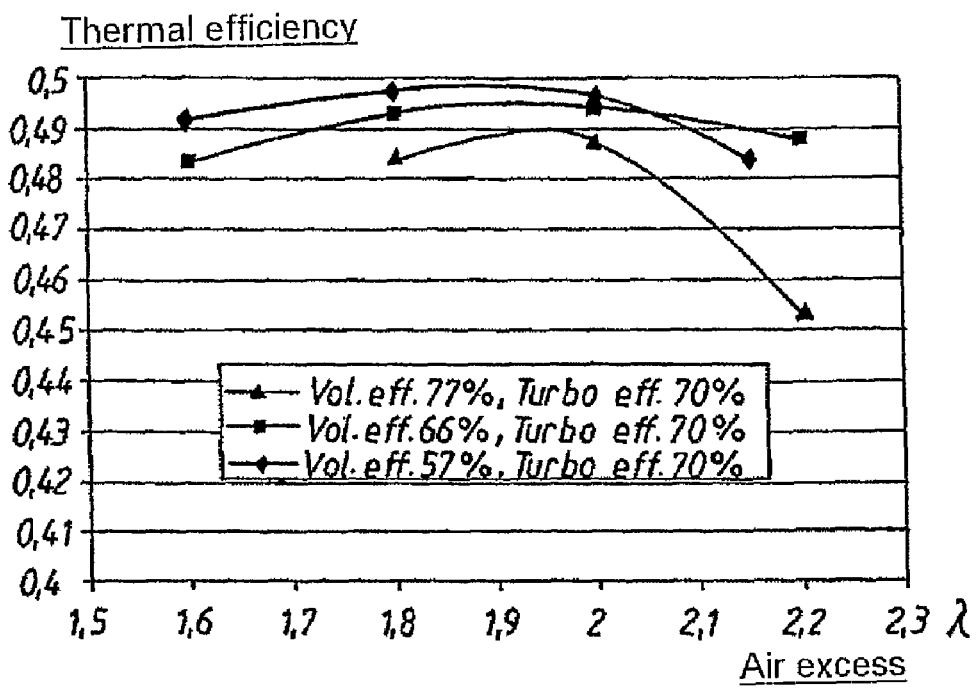
FIG. 3 shows the thermal efficiency as a function of the air excess factor for a turbo system having a turbo map efficiency amounting to 70% per stage.
Figure 4:
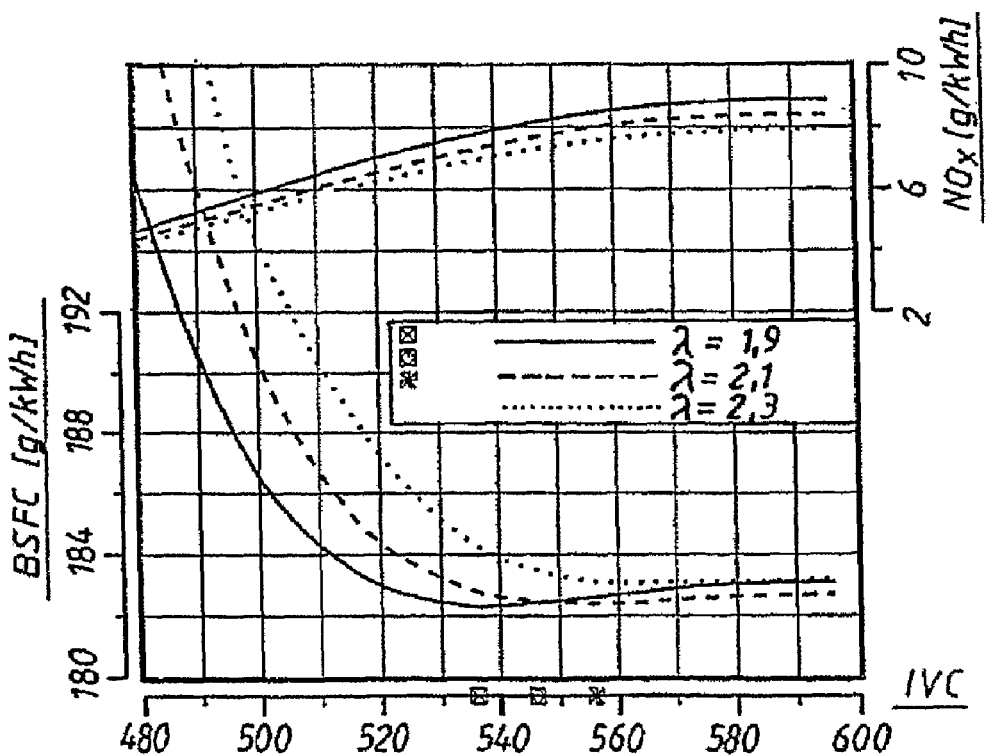
FIG. 4 shows the thermal efficiency expressed as a function of the closing time of the induction valve for an engine having a conventional two-stage supercharging system.
Figure 5:
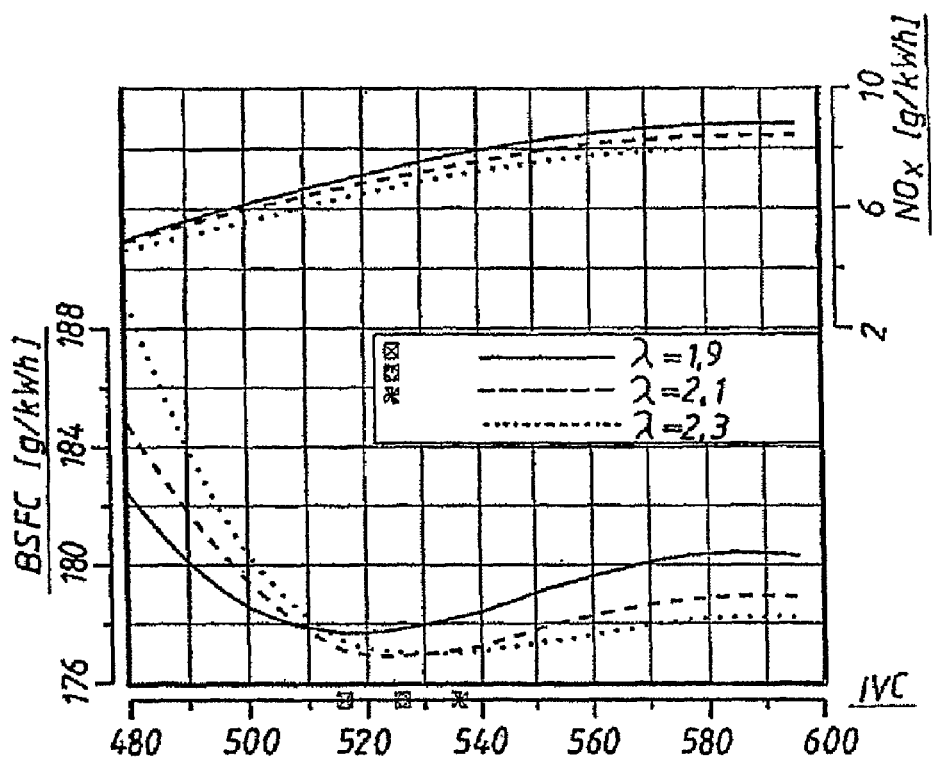
FIG. 5 shows the thermal efficiency as a function of the closing time of the induction valve for an engine equipped with a two-stage supercharging system having enhanced turbo map efficiency amounting to about 65%.
Figure 6:
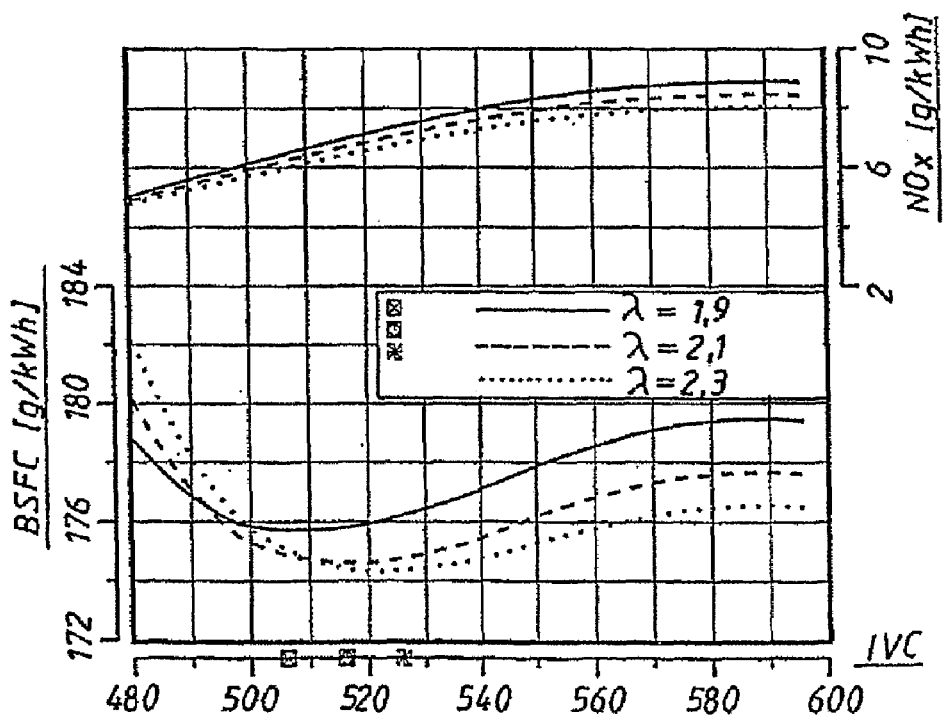
FIG. 6 shows the thermal efficiency as a function of the closing time of the induction valve for an engine equipped with a two-stage supercharging system having enhanced turbo map efficiency amounting to about 70%.

For the adjustment of the opening and/or closing point of the induction valve 57 and exhaust valve 58 respectively, a control unit 61 is provided. The control unit 61 communicates with the respective valve actuator 59, 60 for adjustment of the opening and closing time. The control unit comprises a first representation, in which the desired volumetric efficiency is indicated as a function of the engine load and the mean piston velocity. The representation can be configured in matrix form and represents a chart similar to that shown in FIG. 1. The measurement values which are stored in the matrix are based on test bench measurements in which optimal volumetric efficiency for obtaining maximal thermal efficiency whilst satisfying prevailing emission requirements. The matrix is stored as a database 62, in which a desired volumetric efficiency q is given via input data in the form of engine speed n and engine load, for example expressed in BMEP. Engine speed information is obtained in a known manner, for example through an inductive pick-up, which detects passage of the cogs of a gearwheel mounted on the crankshaft. Engine load information can be obtained, for example, from data relating to injected fuel quantity or by direct measurement from torque transmitters. There is also information relating to desired air excess factor, or, where appropriate, desired equivalent air excess factor, where the internal combustion engine is equipped with exhaust gas recirculation. By equivalent air excess factor is meant the ratio between a particular mass of air and recirculated exhaust gases in the cylinder and the mass of the air which allows stoichiometric combustion. This information is stored as a representation 13 relating to desired air excess as a function of load and engine speed.

Figure 7:
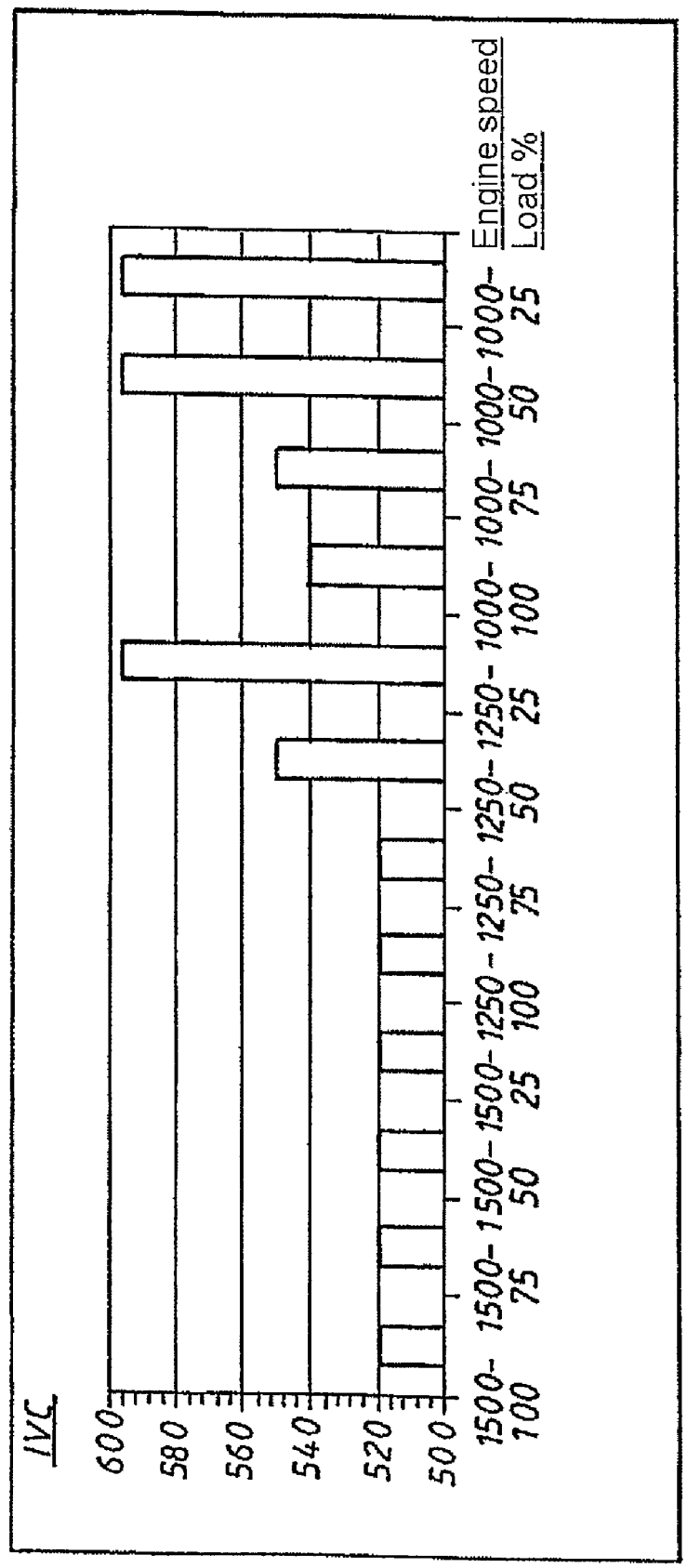
FIG. 7 shows an example of how the variation of the closing time for the inlet valve can be carried out.
Figure 8:
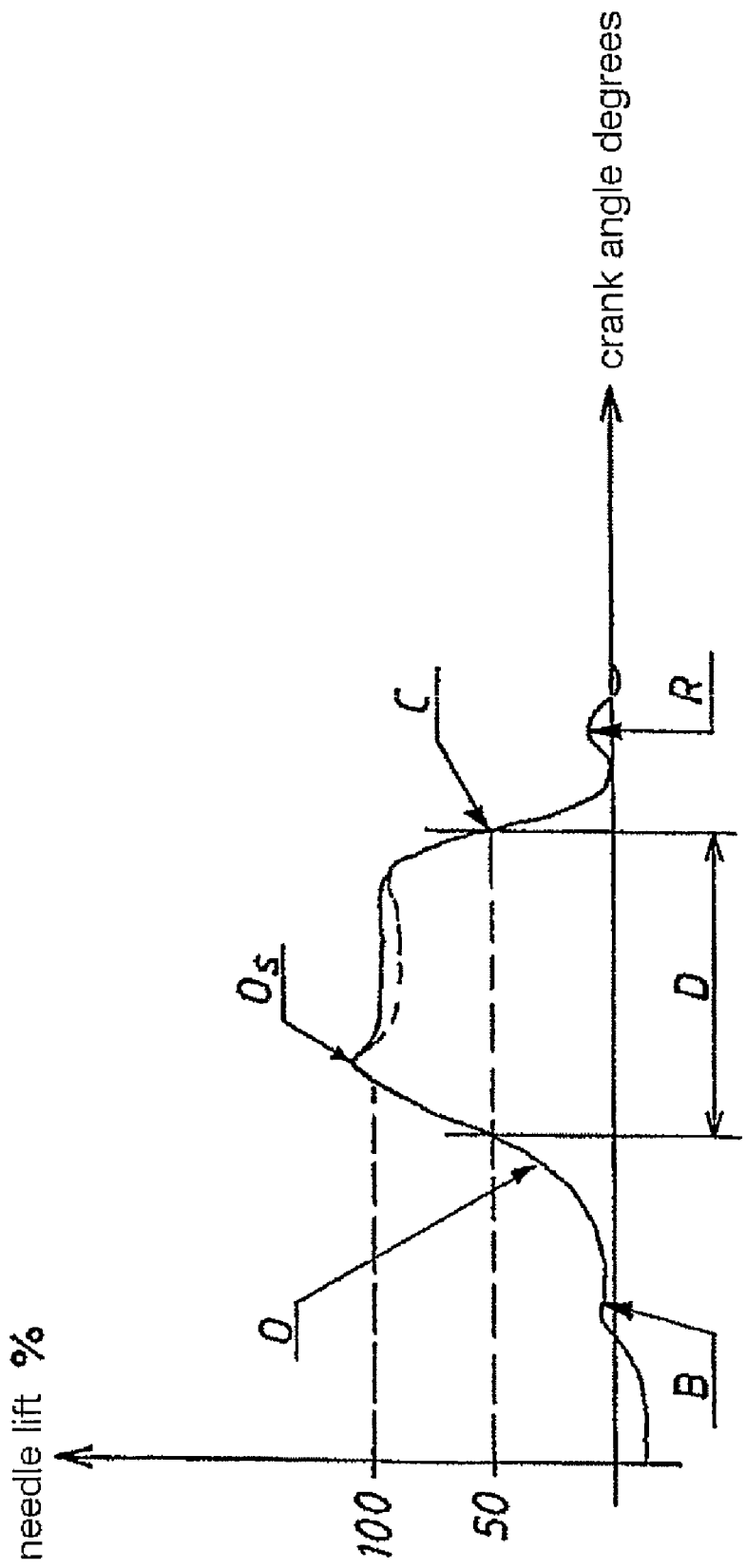
FIG. 8 shows in diagrammatic representation a graph exhibiting the needle lift in an injector as a function of crank angle degrees.
Figure 9A:
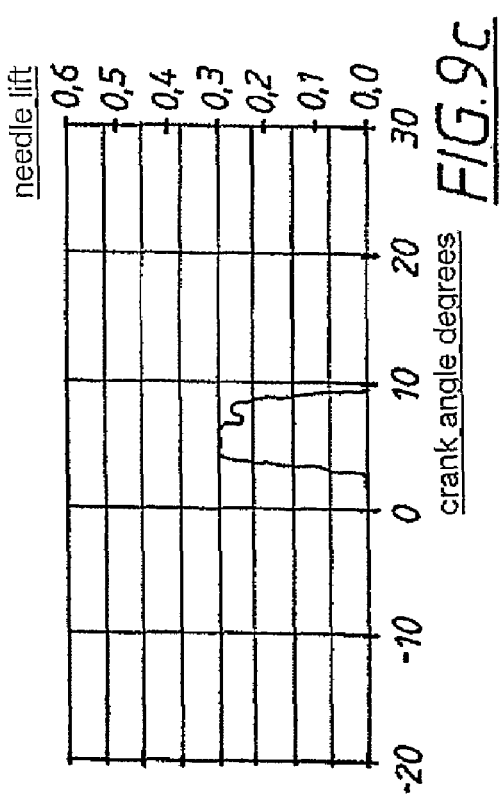
FIGS. 9a-d show measurements of the needle lift as a function of crank angle degrees for a number of operating scenarios.
Figure 9B:
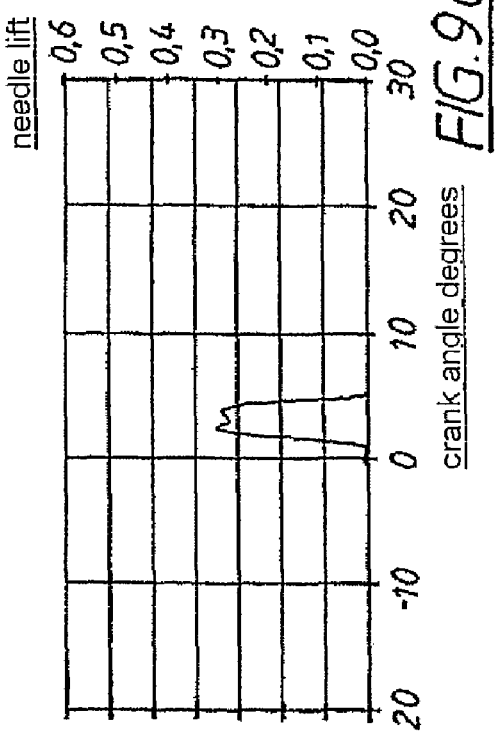
Figure 9C:
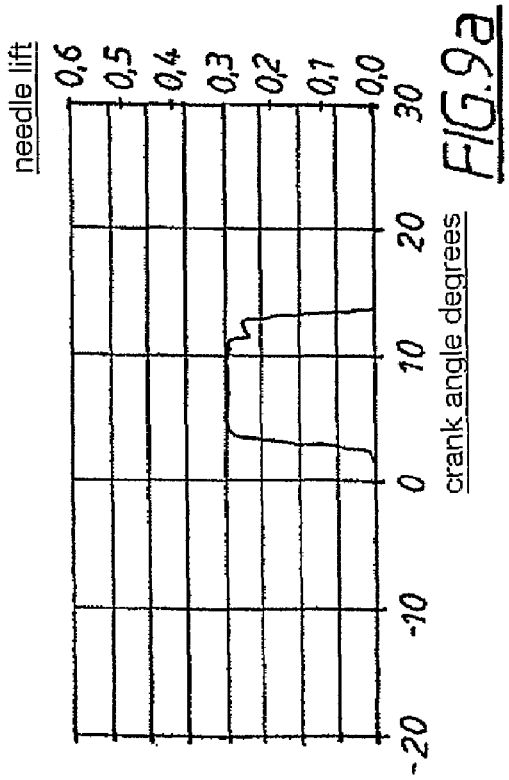
Figure 9D:
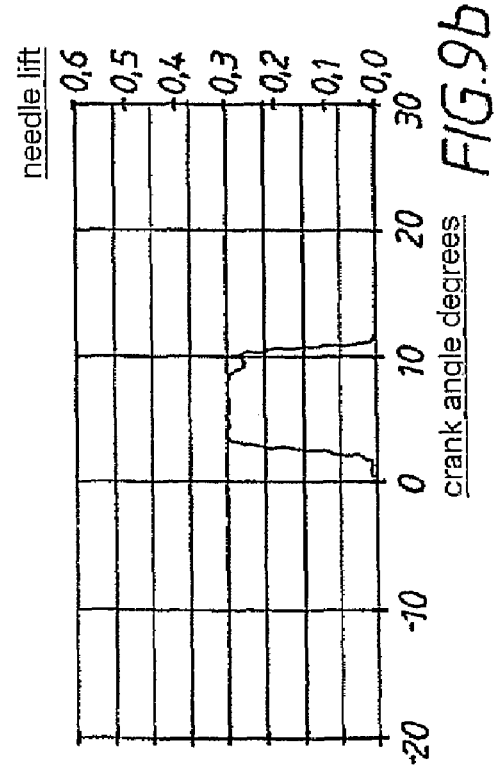
Figure 10:
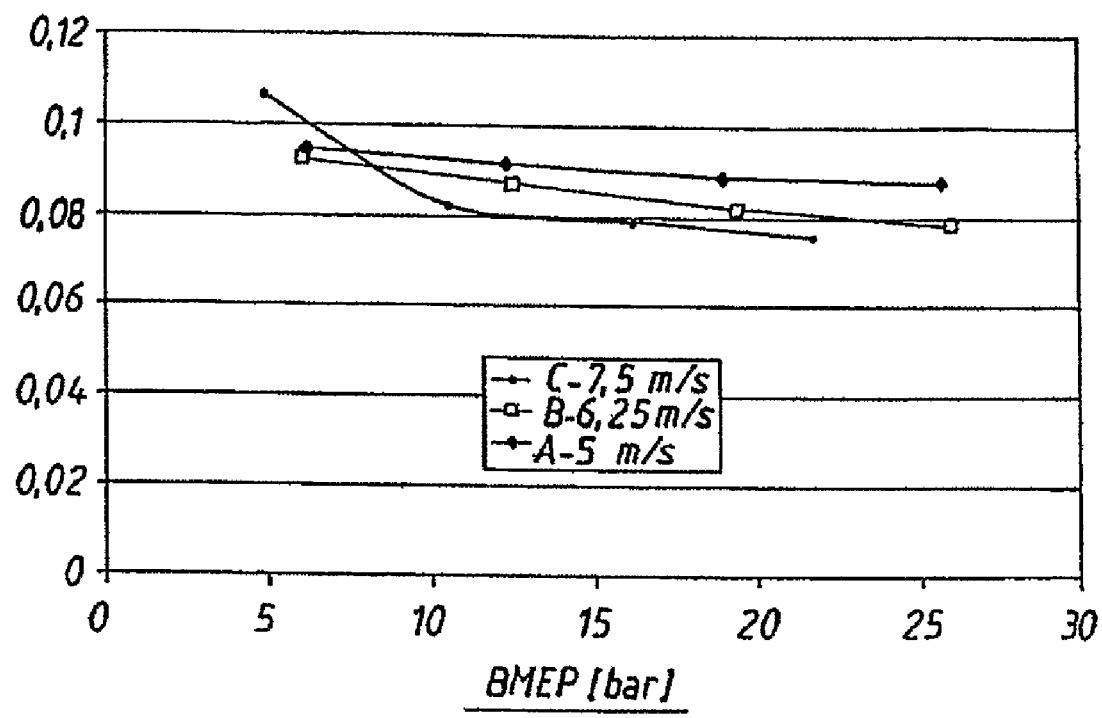
FIG. 10 shows the specific injection time as a function of BMEP of the internal combustion engine for a set of mean piston velocities.
Figure 11:
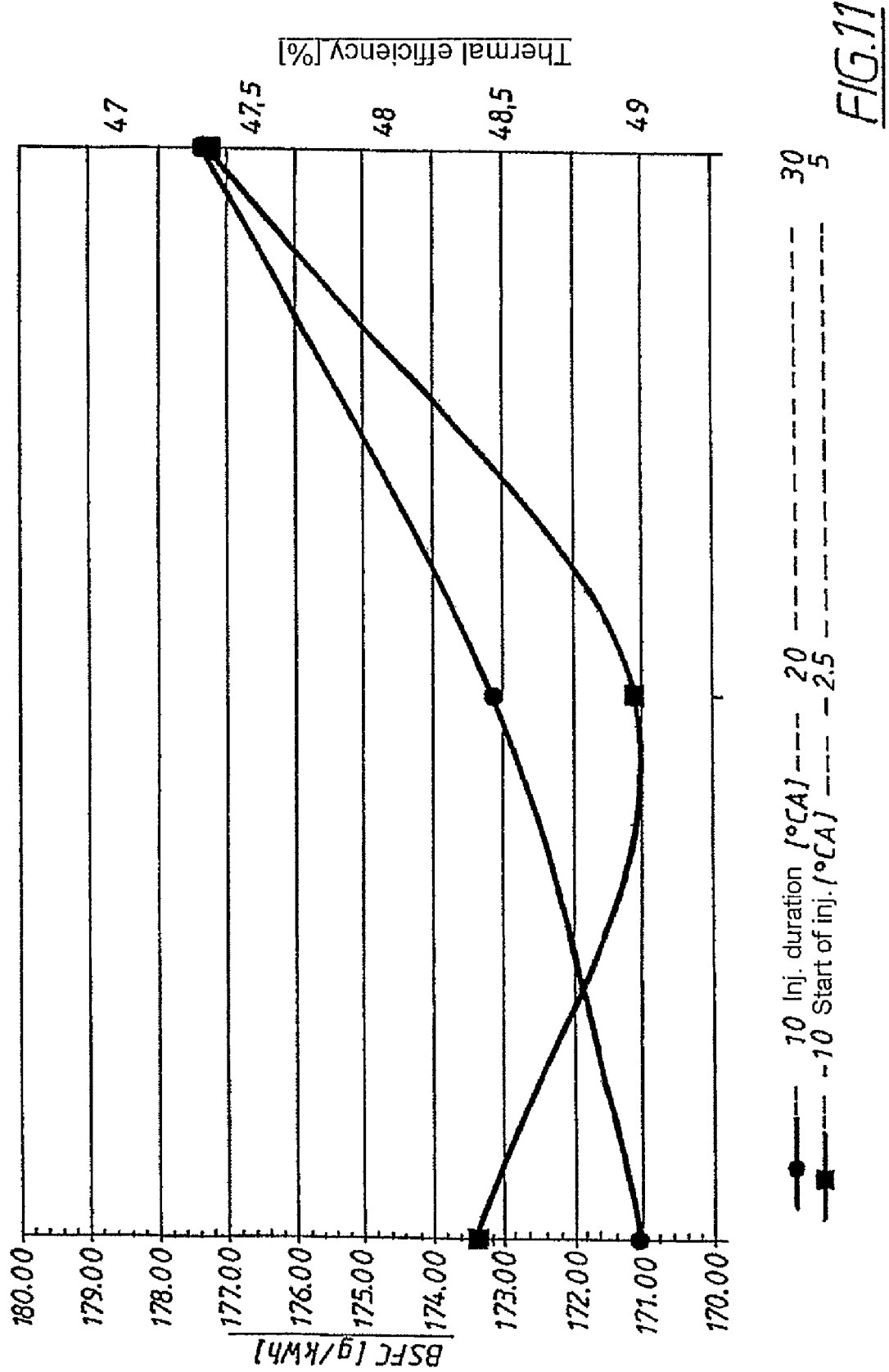
FIG. 11 shows the dependency of the thermal efficiency the starting point and duration of the injection.

From information on desired volumetric efficiency or, where EGR is used, equivalent air excess factor, opening times and closing times of the gas exchange valves 59, 60 are generated in a third representation 64. According to one embodiment of the invention, the representations 62-64 can be simply expressed in a single representation in which the closing time of the induction valve is indicated as a function of engine load and engine speed. One example of such a representation can be found in FIG. 7.

According to one embodiment of the invention, a supercharging system is used which will be described in greater detail below. The supercharging system is intended for, in the first place, diesel engines with a cubic capacity of between about 6 and about 20 liters, for use preferably in heavy-duty vehicles such as trucks, buses and construction machinery. The supercharging system has the characteristic that it offers a considerably more effective supercharge than current systems. The supercharge is realized in two stages with two series-connected, radial-type compressors with intermediate cooling. The first compressor stage, referred to as the low-pressure compressor, is driven by a low-pressure turbine of the axial type. The second compressor stage, the high-pressure compressor, is driven by a high-pressure turbine of the radial type.

Figure 12:
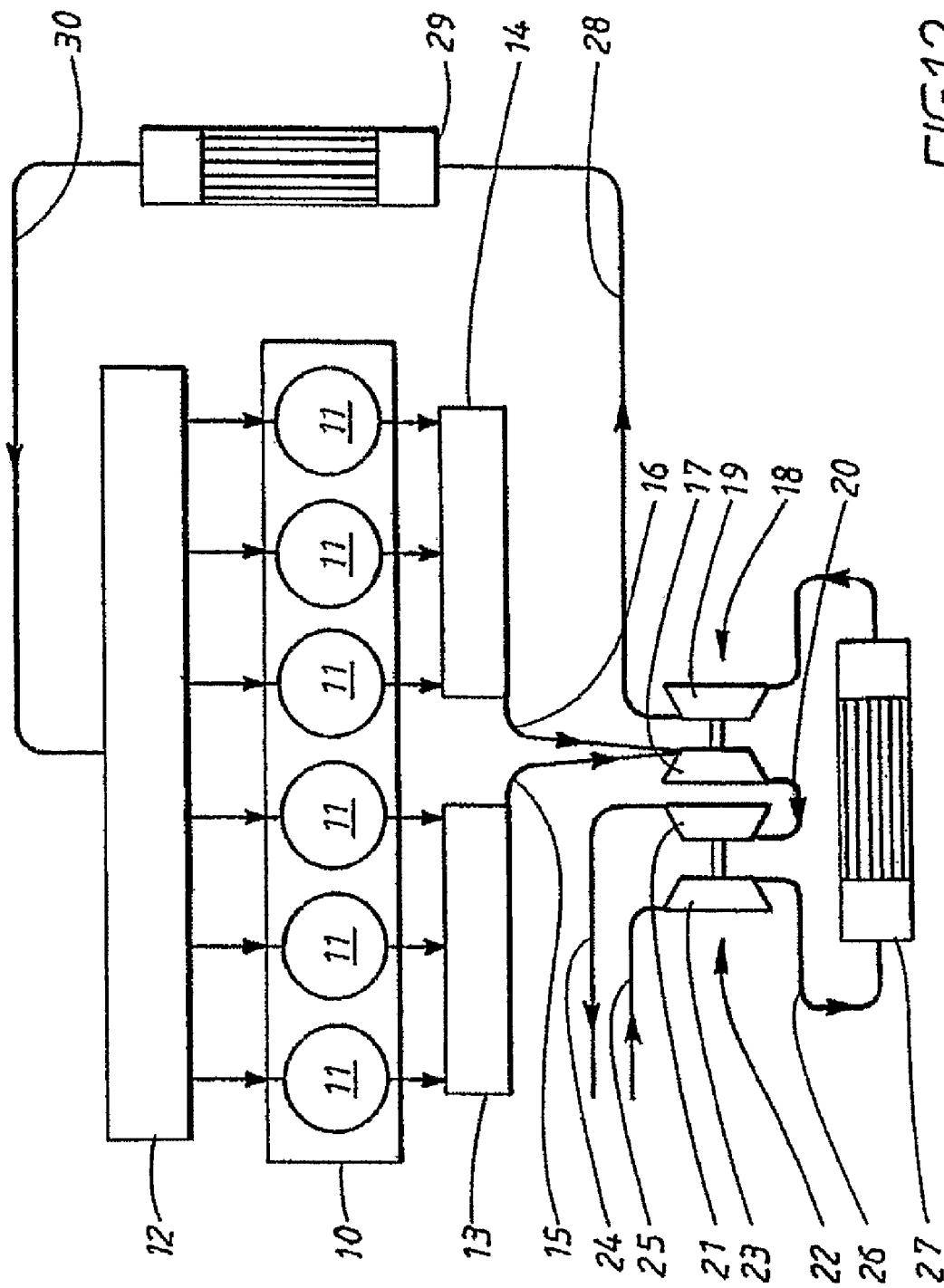
FIG. 12 shows in diagrammatic representation an internal combustion engine having a two-stage turbocharger system.

FIG. 12 shows an engine block 10 having six engine cylinders 11, which communicate in a conventional manner with an inlet manifold 12 and two separate exhaust manifolds 13, 14. Each of these two exhaust manifolds receives exhaust gases from three of the engine cylinders. The exhaust gases are led through separate pipes 15, 16 up to a turbine 17 in a high-pressure turbo unit 18, which comprises a compressor 19 mounted on a common shaft with the turbine 17.

The exhaust gases are led onward through a pipe 20 to a turbine 21 in a low-pressure turbo unit 22, which comprises a compressor 23 mounted on a common shaft with the turbine 21. The exhaust gases are finally led onward through a pipe 24 to the exhaust system of the engine, which can comprise units for the after-treatment of exhaust gases.

Filtered inlet air is admitted to the engine through the pipe 25 and led to the compressor 23 of the low-pressure turbo unit 22. A pipe 26 leads the inlet air onward through a first charge-air cooler 27 to the compressor 19 of the high-pressure turbo unit 18. After this two-stage supercharge with intermediate cooling, the inlet air is led onward through the pipe 28 to a second charge-air cooler 29, whereafter the inlet air reaches the inlet manifold 12 via the pipe 30.

The turbocharger system according to this embodiment is shown in greater detail in FIG. 13, which illustrates the double, spiral inlets 15, 16 to the high-pressure turbine 17, each of which provides half the turbine with gas flow via inlet guide rails 17a. The high-pressure turbine 17 is of the radial type and is connected to the low-pressure turbine 21 by the short intermediate duct 20, which is usable since the low-pressure turbine is of the axial type. This short flow path minimizes pressure losses between the turbine stages.

The high-pressure turbine 17 is mounted together with the high-pressure compressor 19 on the shaft 31. The low-pressure turbine 21 is correspondingly mounted together with the low-pressure compressor 23 on the shaft 32. The two turbo units 18, 22 are orientated along essentially the same longitudinal axis. The intermediate duct 20 is equipped with seals 33, which combat installation tensions and leakage by allowing a certain mobility in the axial and radial directions, which absorbs thermal stresses and certain deficiency of assembly.

The axial-type low-pressure turbine is provided with inlet guide rails 34, which are configured to optimize the work close to the center section of the turbine for maximum efficiency (so-called "compound lean" configuration with a guide rail in which the center of gravity of the profiles lie along a curved line, with a view to distributing the work in the turbine stage so that it is optimized toward the center of the turbine blade where marginal effects and losses are least). The low-pressure compressor is of the radial type with blades configured with a large back sweep, as will be described in greater detail below with reference to FIG. 14. The high-pressure compressor 19 is likewise of the radial type, the blades of which expediently are backswept in a corresponding manner to those in the low-pressure compressor 23.

It can be seen from FIG. 14 that a blade angle $\beta_{b2}$, between an imaginary extension of the blade 35 along the centerline between root section and tip section in the direction of the outlet tangent and a line 36 (in dash-dot representation) connecting the center axis of the compressor wheel to the outer point of the blade, is at least about 40 degrees, expediently at least about 45-55 degrees. Turbo compressors available on the market have blade angles $\beta_{b2}$ between about 25 and about 35 degrees. In testing of a turbocharger system according to this embodiment, it has proved advantageous to increase the blade angle to at least about 40 degrees. The effect of this increase in blade angle consists primarily in the compressor wheel with associated turbine rotating at a higher speed for a given pressure ratio. The increase in speed means that the diameter, and hence also the mass moment of inertia, of the turbine wheel can be reduced. As a side effect of this, the transient response of the engine is also improved, since the reduced mass moment of inertia means that the turbine wheel can more easily accelerate to its effective speed range. In addition, the compressor efficiency increases, inter alia as a result of reduced velocity differential between the flow along the pressure side and suction side of the blade, leading to less secondary flow and hence lower losses, and as a result of a reduction in flow velocity in the rotor outlet, leading to lower losses in the following diffuser.

Both the compressors are provided with guide rails downstream of the respective compressor wheel in order to optimize the build-up of pressure. This diffuser is advantageously of the LSA (Low Solidity Airfoil) type, signifying a diffuser with aerodynamically configured blades whose length has a ratio to the distance between the blades (pitch) ranging between 0.75 and 1.5.

An outlet diffuser 37 is placed after the low-pressure turbine 21 in order to recover dynamic pressure leaving the turbine. The diffuser opens out into an exhaust collector 38, which guides the exhaust gases out to the exhaust pipe 24. The diffuser is designed as an annular duct with axial inlet and virtually radial outlet. The outer duct of the diffuser is closed off with a flange 37a in order to prevent the outflow from being disturbed by recirculating gases from the following collector. This flange 37a can be placed asymmetrically in order to reduce the size of the collector. The flange has its greatest radial height directly in front of the outlet of the exhaust collector 38 and its least radial height on the diametrically opposite side.

The high-pressure turbine 17 shown in FIG. 15, which drives the high-pressure compressor 19, is of the radial type, having a turbine wheel which, for relatively high-speed rotation, is realized with small diameter. This makes it possible to avoid those kinds of recesses 39 in the turbine wheel hub 40 which are normally used in the prior art in turbines of this type (so-called "scalloping"). In FIG. 15, these recesses 39 are shown with dashed lines, simply in order to illustrate the prior art. As a result of the elimination of these recesses, the turbine wheel is able to operate more effectively for a higher overall efficiency.

The turbines have inlet guide rails upstream of each wheel for optimal flow against the wheel. The arrangement comprising a radial-type high-pressure and axial-type low-pressure turbine means that flow losses between the turbine stages can be minimized by means of a short intermediate duct. The high-pressure turbine has been provided with a double spiral inlet in order to make optimal use of the energy in the exhaust gases from the diesel engine. In variants of the embodiment can also, however, be used in conventional inlets having single, double or multiple inlets.

In order to produce a pressure suitable for a diesel engine of 6 to 20 liters cubic capacity, about 4-6 bar absolute pressure, each compressor needs only to have a pressure increase of 2-2.5 times the inlet pressure and is therefore optimized for lower pressure ratios than normal single-stage compressors.

The turbocharger system which is described above can advantageously be applied to a four-stroke diesel engine with so-called Miller functionality, which means that some of the effective compression is moved outside the cylinder to the turbo compressors with subsequent cooling in the charge-air coolers, whereupon the temperature of the air volume is reduced, which produces a more effective thermodynamic process in the cylinder and lower exhaust emissions, for example nitrogen oxides (NOx).

The turbocharger system can also be used for engines with exhaust gas recirculation of the "Long Route EGR" type, i.e. in which exhaust gases can be removed after the outlet of the low-pressure turbine 21 and recirculated to the inlet side of the engine before the inlet of the low-pressure compressor.

In order to reduce the emissions from the internal combustion engine, the internal combustion engine can be equipped with means for catalytic reduction of the exhaust gases, possibly in combination with EGR. One example of an existing technique for selective catalytic reduction of nitrogen oxides is given in document U.S. Pat. No. 6,063,350, whose description is incorporated within the present application.

The internal combustion engine can further be equipped with a particle filter for reducing soot emissions from the internal combustion engine. One example of a particle filter which can be utilized in conjunction with an engine utilizing an engine control mechanism according to the present invention is given in document U.S. Pat. No. 4,902,487, the disclosure of which is expressly incorporated herein by reference.

The invention should not be considered limited to the above-stated embodiments but can freely be modified within the scope of the patent claims.

What is claimed is:

1. A method for controlling a diesel-type piston engine comprising at least one combustion chamber formed by a cylinder (52) and a movably arranged piston (53) in each cylinder that is connected to a crankshaft (54), an injection device (56) configured to inject fuel directly into the combustion chamber, and a turbo system comprising a low-pressure turbo (22) and a high-pressure turbo (18) disposed downstream of the low-pressure turbo (22), the low-pressure turbo (22) and high-pressure turbo (18) each having a turbo map efficiency greater than 60%, the method comprising utilizing a control mechanism for gas exchange valves (57, 58) to establish at least a first operating range for the internal combustion engine at a mean piston velocity greater than 6 m/s and at an engine load greater than 15 bar BMEP at which the volumetric efficiency within said first operating range is less than 70%.

2. The method as recited in claim 1, wherein said low-pressure turbo (22) and high-pressure turbo (18) each have a turbo map efficiency greater than 65%.

3. The method as recited in claim 1, wherein said low-pressure turbo (22) and high-pressure turbo (18) each have a turbo map efficiency greater than 70%.

4. The method as recited in claim 1, further comprising controlling the gas exchange valves (57, 58) fitted to said combustion chamber to affect engine operation within an operating range with a load between 5 and 30 bar BMEP and for mean piston velocities between 5 and 7.5 m/s and thereby providing a volumetric efficiency less than 85%.

5. The method as recited in claim 4, wherein the gas exchange valves (57, 58) fitted to the combustion chamber are controlled to provide a volumetric efficiency which varies between 45% and 85% in dependence on the operating state of the engine.

6. The method as recited in claim 1, wherein the closure inlet valves (57) fitted to said combustion chamber varies in dependence on the operating state of the internal combustion engine.

7. The method as recited in claim 1, wherein the inlet valves (57) fitted to said combustion chamber are closed before or after the closing time which generates maximum volumetric efficiency for the internal combustion engine.

8. The method as recited in claim 1, further comprising controlling the injection of fuel from said injection device (56) to a specific injection time less than 0.1 crank angle degrees/(bar*m/s) within an operating range for the internal combustion engine with an engine load greater than 7 bar BMEP.

9. The method as recited in claim 1, further comprising controlling the injection of fuel from said injection device (56) to a specific injection time less than 0.095 crank angle degrees/(bar*m/s) within an operating range for the internal combustion engine with an engine load greater than 12 bar BMEP.

10. The method as recited in claim 1, further comprising controlling the injection of fuel from said injection device (56) to a specific injection time less than 0.095 crank angle degrees/(bar*m/s) within an operating range for the internal combustion engine with a mean piston velocity greater than 6 m/s.

11. The method as recited in claim 1, further comprising controlling the injection of fuel from said injection device (56) to a specific injection time less than 0.09 crank angle degrees/(bar*m/s) within an operating range for the internal combustion engine with an engine load greater than 18 bar BMEP.

12. The method as recited in claim 1, further comprising adjusting the air and fuel supply to said combustion chamber to provide an equivalent air excess factor (λ) within the range 1.7-2.05 at an engine load within the range 18-30 bar BMEP.

13. The method as recited in claim 1, further comprising controlling the fuel supply to be initiated within the range 0 to 10 crank angle degrees before upper dead center.

14. The method as recited in claim 1, wherein the maximum injection pressure of the injection device (46) is controlled to be greater than 1600 bar.

15. The method as recited in claim 1, wherein the ratio between the highest needle opening pressure NOP and the maximum injection pressure maxIP is greater than 0.7.

16. The method as recited in claim 1, wherein injection is realized through an injection nozzle having more than 6 holes.

17. The method as recited in claim 1, wherein a charge-air cooler (27) is disposed between said low-pressure turbo and high-pressure turbo.

18. The method as recited in claim 1, wherein exhaust gases from the combustion process in said combustion chamber pass through an at least partially heat-insulated exhaust duct.

19. The method as recited in claim 1, further comprising adjusting the air and fuel supply to said combustion chamber to allow a maximum cylinder pressure during combustion greater than 8*BMEP.

20. The method as recited in claim 19, further comprising adjusting the air and fuel supply to the combustion chamber to allow a maximum cylinder pressure during combustion greater than 9*BMEP.

21. The method as recited in claim 20, further comprising adjusting the air and fuel supply to said combustion chamber to allow a maximum cylinder pressure during combustion greater than 10*BMEP.

22. A diesel-type piston engine comprising at least one combustion chamber formed by a cylinder (52) and a movably arranged piston (53) in each cylinder that is connected to a crankshaft (54), an injection device (56) configured to inject fuel directly into said combustion chamber, and a turbo system comprising a low-pressure turbo (22) and a high-pressure turbo (18) which is disposed downstream of said low-pressure turbo (22), said low-pressure turbo (22) and high-pressure turbo (18) each have a turbo map efficiency greater than 60%, and further comprising a control mechanism of gas exchange valves (57, 58) that is configured to provide at least a first operating range for the internal combustion engine at a mean piston velocity greater than 6 m/s and at an engine load greater than 15 bar BMEP, in which the volumetric efficiency within said first operating range is less than 70%.

23. The piston engine as recited in claim 22, wherein said low-pressure turbo (22) and high-pressure turbo (18) each have a turbo map efficiency greater than 65%.

24. The piston engine as recited in claim 22, wherein said low-pressure turbo (22) and high-pressure turbo (18) each have a turbo map efficiency greater than 70%.

25. The piston engine as recited in claim 22, where the gas exchange valves (57, 58) are fitted to said combustion chamber are configured to be controlled so as, within an operating range for the internal combustion engine with a load between 5 and 30 bar BMEP and for mean piston velocities between 5 and 7.5 m/s, to provide a volumetric efficiency less than 85%.

26. The piston engine as recited in claim 25, where the gas exchange valves (57, 58) are fitted to said combustion chamber and configured to be controlled to provide a volumetric efficiency which varies between 45% and 85% in dependence on the operating state of the engine.

27. The piston engine as recited in claim 22, wherein the closure of inlet valves (57) fitted to said combustion chamber is configured to vary in dependence on the operating state of the internal combustion engine.

28. The piston engine as recited in claim 22, wherein inlet valves (57) fitted to said combustion chamber are configured to be closed before or after the optimum for volumetric efficiency for the internal combustion engine.

29. The piston engine as recited in claim 22, wherein inlet valves (57) fitted to said combustion chamber are configured to be closed before or after lower dead center.

30. The piston engine as recited in claim 22, wherein the closing time of inlet valves (57) fitted to said combustion chamber varies in dependence on the operating state of the internal combustion engine.

31. The piston engine as recited in claim 22, wherein said injection device (56) is configured to have a specific injection time less than 0.12 crank angle degrees/(bar * m/s) within an operating range for the internal combustion engine with an engine load greater than 7 bar BMEP.

32. The piston engine as recited in claim 22, wherein said injection device (56) is configured to have a specific injection time less than 0.095 crank angle degrees/(bar*m/s) within an operating range for the internal combustion engine with an engine load greater than 12 bar BMEP.

33. The piston engine as recited in claim 22, wherein said injection device (56) is configured to have a specific injection time less than 0.095 crank angle degrees/(bar*m/s) within an operating range for the internal combustion engine with a mean piston velocity greater than 6 m/s.

34. The piston engine as recited in claim 22, wherein said injection device (56) is configured to have a specific injection time less than 0.09 crank angle degrees/(bar*m/s) within an operating range for the internal combustion engine with an engine load greater than 18 bar BMEP.

35. The piston engine as recited in claim 34, further comprising a charge-air cooler (27) disposed between said low-pressure turbo (22) and high-pressure turbo (18).

36. The piston engine as recited in claim 22, wherein the air and fuel supply to said combustion chamber is adjusted to provide an equivalent air excess factor ($\lambda$) within the range 1.7-2.05 at an engine load within the range 18-30 bar BMEP.

37. The piston engine as recited in claim 22, wherein said injection device (56) is configured to initiate the fuel supply within the range 0 to 10 crank angle degrees before upper dead center.

38. The piston engine as recited in claim 22, wherein the injection device (56) is configured to provide a maximum injection pressure greater than 1600 bar.

39. The piston engine as recited in claim 22, wherein the injection device (56) is configured to provide a ratio between the needle opening pressure NOP and the maximum injection pressure maxIP greater than 0.7.

40. The piston engine as recited in claim 22, further comprising an at least partially heat-insulated exhaust duct that is connected to an exhaust port fitted to said combustion chamber.

41. The piston engine as recited in claim 22, wherein the air and fuel supply to said combustion chamber is adjusted to allow a maximum cylinder pressure during combustion greater than 8*BMEP.

42. The piston engine as recited in claim 41, wherein the air and fuel supply to said combustion chamber is adjusted to allow a maximum cylinder pressure during combustion greater than 9*BMEP.

43. The piston engine as recited in claim 42, wherein the air and fuel supply to said combustion chamber is adjusted to allow a maximum cylinder pressure during combustion greater than 10*BMEP.

* * * * *